(12) United States Patent
Kalva et al.

(10) Patent No.: US 11,438,604 B2
(45) Date of Patent: Sep. 6, 2022

(54) METHODS AND SYSTEMS FOR ADAPTIVE CROPPING

(71) Applicant: OP Solutions, LLC, Amherst, MA (US)

(72) Inventors: Hari Kalva, Boca Raton, FL (US); Borivoje Furht, Boca Raton, FL (US); Velibor Adzic, Boca Raton, FL (US)

(73) Assignee: OP Solutions, LLC, Amherst, MA (US)

( * ) Notice: Subject to any disclaimer, the term of this patent is extended or adjusted under 35 U.S.C. 154(b) by 0 days.

(21) Appl. No.: 17/193,671

(22) Filed: Mar. 5, 2021

(65) Prior Publication Data
US 2021/0195219 A1    Jun. 24, 2021

Related U.S. Application Data

(63) Continuation of application No. 17/091,052, filed on Nov. 6, 2020, now Pat. No. 11,006,132.
(Continued)

(51) Int. Cl.
*H04N 19/184* (2014.01)
*H04N 19/172* (2014.01)
(Continued)

(52) U.S. Cl.
CPC ......... *H04N 19/184* (2014.11); *H04N 19/103* (2014.11); *H04N 19/136* (2014.11); *H04N 19/172* (2014.11)

(58) Field of Classification Search
CPC ............................ H04N 19/184; H04N 19/172
See application file for complete search history.

(56) References Cited

U.S. PATENT DOCUMENTS

| 9,305,558 B2 | 4/2016 | Chen et al. |
| 9,319,677 B2 | 4/2016 | Chang et al. |

(Continued)

FOREIGN PATENT DOCUMENTS

| EP | 3057319 A1 | 8/2016 |
| WO | 2018130414 A1 | 7/2018 |
| WO | 2019141907 A1 | 7/2019 |

OTHER PUBLICATIONS

International Search Report; PCT/US20/59323; dated Feb. 12, 2021; Authorized Officer: Lee Young.
(Continued)

*Primary Examiner* — Jerry T Jean Baptiste
(74) *Attorney, Agent, or Firm* — OP Solutions IP Department; Paul Ackerman

(57) ABSTRACT

A decoder includes circuitry configured to receive a bitstream, identify, as a function of the bitstream, a current frame, and a cropped sub-frame of the current frame, wherein the cropped sub-frame is signaled in the bitstream, the cropped sub-frame is signaled using at least a horizontal offset, the at least a horizontal offset includes an sps_conf_win_left_offset and an sps_conf_win_right_offset, determine, as a function of the bitstream, a scaling constant associated with the cropped sub-frame, wherein the scaling constant is signaled within the bit stream, and the scaling constant is signaled as a function of a pps_pic_width_in_luma_samples parameter, a pps_scaling_win_right_offset parameter, and a pps_scaling_win_left_offset parameter, and reconstruct pixel data of the cropped sub-frame using the scaling constant.

11 Claims, 8 Drawing Sheets

Related U.S. Application Data

(60) Provisional application No. 62/932,597, filed on Nov. 8, 2019.

(51) Int. Cl.
*H04N 19/136* (2014.01)
*H04N 19/103* (2014.01)

(56) References Cited

U.S. PATENT DOCUMENTS

| | | | |
|---|---|---|---|
| 9,565,397 B2 | 2/2017 | Frink et al. | |
| 2001/0014178 A1* | 8/2001 | Boon | H04N 19/00 |
| | | | 382/238 |
| 2005/0117815 A1* | 6/2005 | Lippincott | H04N 7/0125 |
| | | | 348/E7.016 |
| 2005/0220353 A1 | 10/2005 | Karczewicz | |
| 2007/0160153 A1 | 7/2007 | Sullivan | |
| 2009/0060034 A1 | 3/2009 | Park et al. | |
| 2010/0080287 A1 | 4/2010 | Ali | |
| 2010/0150231 A1 | 6/2010 | Huang et al. | |
| 2010/0208805 A1 | 8/2010 | Yu | |
| 2011/0013692 A1 | 1/2011 | Cohen et al. | |
| 2012/0069135 A1 | 3/2012 | Cipolli et al. | |
| 2013/0089135 A1 | 4/2013 | Chen et al. | |
| 2013/0177084 A1 | 7/2013 | Wang et al. | |
| 2013/0188730 A1 | 7/2013 | Hong et al. | |
| 2013/0266067 A1 | 10/2013 | Song et al. | |
| 2014/0241437 A1 | 8/2014 | Seregin et al. | |
| 2014/0269912 A1 | 9/2014 | Sullivan | |
| 2014/0328387 A1 | 11/2014 | Puri et al. | |
| 2015/0222928 A1* | 8/2015 | Tian | H04N 19/513 |
| | | | 375/240.16 |
| 2015/0319442 A1 | 11/2015 | Puri | |
| 2017/0155911 A1* | 6/2017 | Lin | H04N 19/46 |
| 2018/0098089 A1 | 4/2018 | Chen et al. | |
| 2018/0160117 A1 | 6/2018 | Mukherjee et al. | |
| 2019/0089976 A1 | 3/2019 | Huang et al. | |
| 2019/0149837 A1 | 5/2019 | Lim et al. | |
| 2019/0230285 A1 | 7/2019 | Kim | |

OTHER PUBLICATIONS

Fung et al., "New Architecture for Dynamic Frame-Skipping Transcoder," IEEE Transactions on Image Processing, Aug. 2002 (http://ira.lib.polyu.edu.hk/bitstream/10397/253/1/dynamic-frame_02.pdf).

Seregin et al., "AHG8: Scaling Window for Scaling Window Derivation," Joint Video Experts Team (JVEI) of ITU-T SG 16 WP 3 and ISO/IEC JTC 1/SC 29/ WG 11, JVET-P0590-V3, Oct. 10, 2019. Downloaded from http://phenix.it-sudparis.eu/jvet/.

* cited by examiner

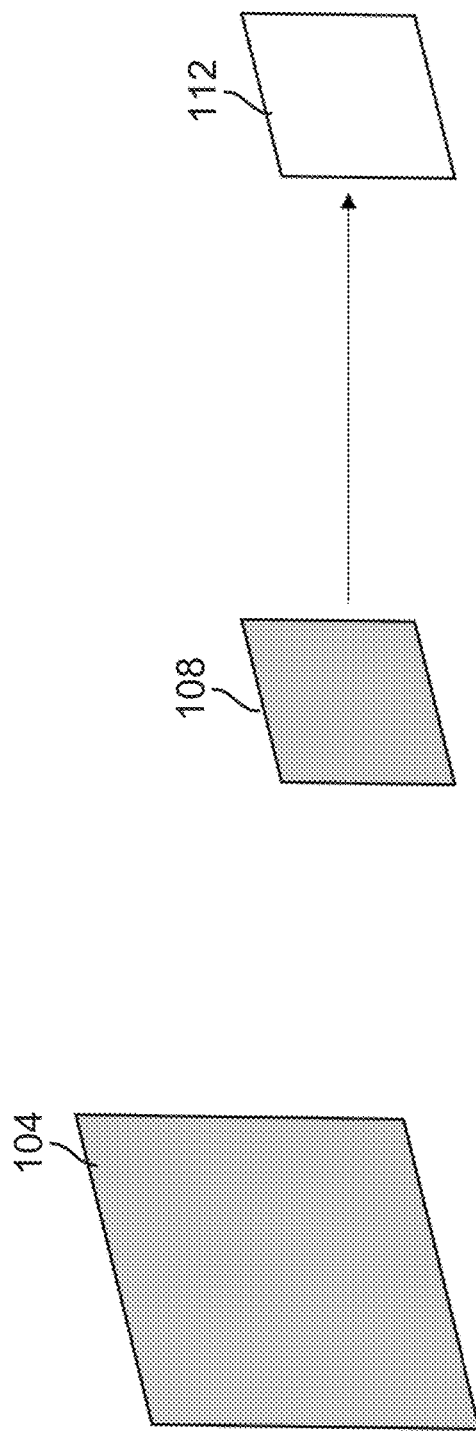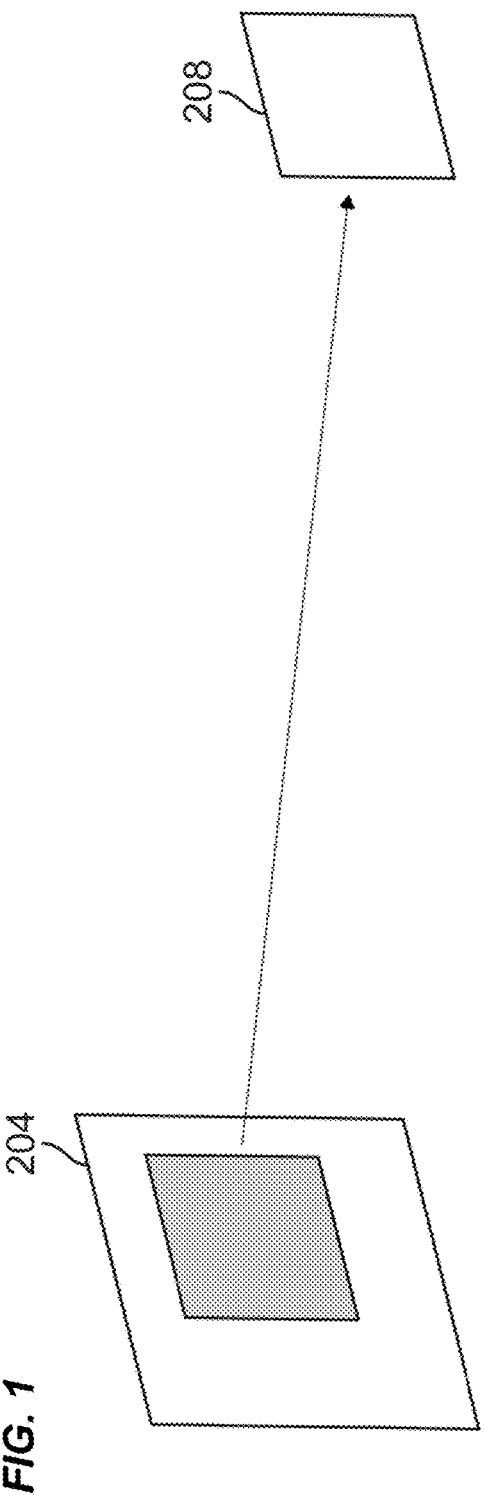

METHODS AND SYSTEMS FOR ADAPTIVE CROPPING

CROSS-REFERENCE TO RELATED APPLICATIONS

This application is a continuation of U.S. Nonprovisional application Ser. No. 17/091,052, filed on Nov. 6, 2020 and entitled "METHODS AND SYSTEMS FOR ADAPTIVE CROPPING," which claims the benefit of priority of U.S. Provisional Patent Application Ser. No. 62/932,597, filed on Nov. 8, 2019, and titled "METHODS AND SYSTEMS FOR ADAPTIVE CROPPING." Each of U.S. Nonprovisional application Ser. No. 17/091,052 and U.S. Provisional Patent Application Ser. No. 62/932,597 is incorporated by reference herein in its entirety.

FIELD OF THE INVENTION

The present invention generally relates to the field of video compression. In particular, the present invention is directed to methods and systems for adaptive cropping.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)'s advanced video coding (AVC) standard (also referred to as H.264). Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

SUMMARY OF THE DISCLOSURE

In an aspect, a decoder includes circuitry configured to receive a bitstream, identify, as a function of the bitstream, a current frame, and a cropped sub-frame of the current frame, wherein the cropped sub-frame is signaled in the bitstream, the cropped sub-frame is signaled using at least a horizontal offset, the at least a horizontal offset includes an sps_conf_win_left_offset and an sps_conf_win_right_offset, determine, as a function of the bitstream, a scaling constant associated with the cropped sub-frame, wherein the scaling constant is signaled within the bit stream, and the scaling constant is signaled as a function of a pps_pic_width_in_luma_samples parameter, a pps_scaling_win_right_offset parameter, and a pps_scaling_win_left_offset parameter, and reconstruct pixel data of the cropped sub-frame using the scaling constant.

In another aspect, a method includes receiving, by a decoder, a bitstream, identifying, by the decoder and as a function of the bitstream, a current frame, and a cropped sub-frame of the current frame, wherein the cropped sub-frame is signaled in the bitstream, the cropped sub-frame is signaled using at least a horizontal offset, the at least a horizontal offset includes an sps_conf_win_left_offset and an sps_conf_win_right_offset, determining, by the decoder and as a function of the bitstream, a scaling constant associated with the cropped sub-frame, wherein the scaling constant is signaled within the bit stream and the scaling constant is signaled as a function of a pps_pic_width_in_luma_samples parameter, a pps_scaling_win_right_offset parameter, and a pps_scaling_win_left_offset parameter, and reconstructing, by the decoder, pixel data of the cropped sub-frame using the scaling constant.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a block diagram illustrating an exemplary embodiment of existing cropping methods;

FIG. 2 is an illustration of an exemplary embodiment of a reference frame and sub-frame;

DETAILED DESCRIPTION

Figure 3:
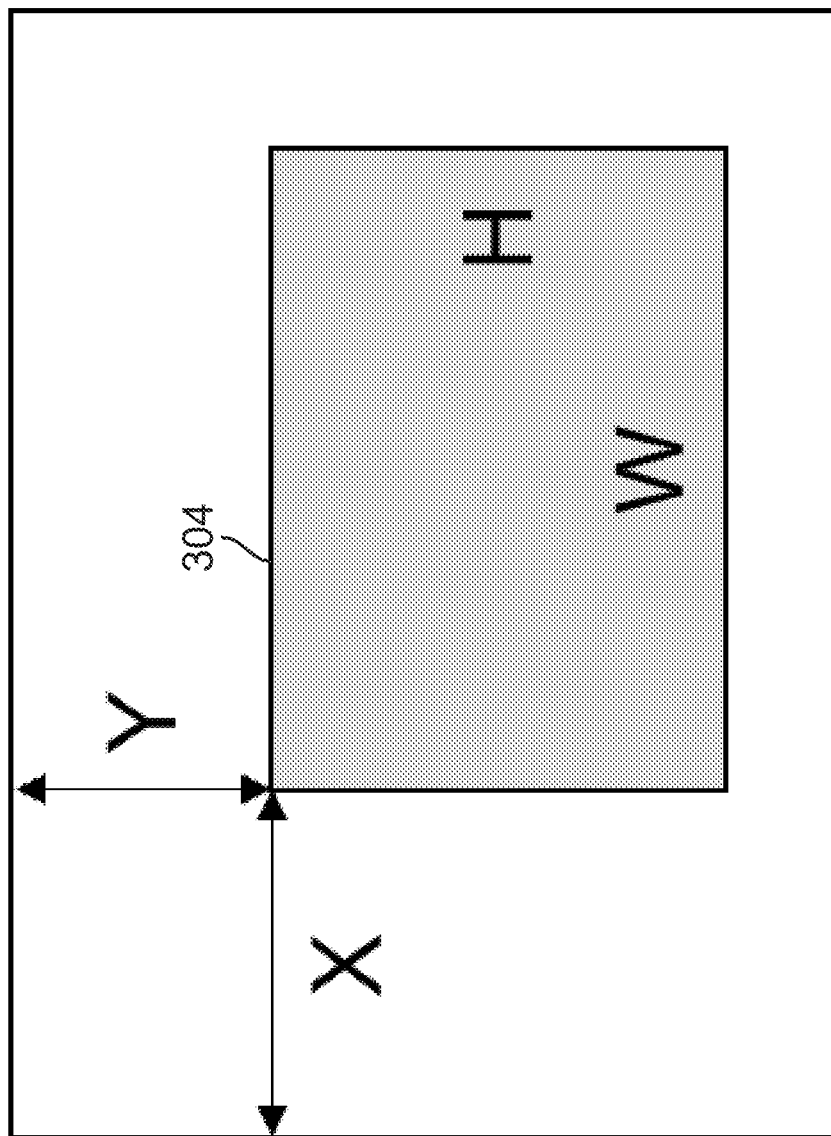
FIG. 3 is an illustration of an exemplary embodiment of a reference frame and sub-frame.

In traditional video coding systems, video sequence is divided into groups-of-pictures (GOP). Each GOP is self-contained in the sense of temporal and spatial prediction. Usually, first picture in the group is used as a reference picture for the subsequent pictures. Temporal and spatial relationships between the pictures allow for the very efficient compression using predictive coding.

In certain scenarios during the transmission of the video a need may arise to crop frames to be decoded, for instance to reduce the bitrate in order to facilitate continuous playback. In many current state-of-the-art encoders, cropping is managed by re-coding and re-sending a whole portion of the video known as group-of-pictures (GOP), which includes an intra-frame (I-frame) used as a reference, and information usable to predict other frames from the reference. This requires sending the intra-frame (I-frame) which can incur additional costs, since those frames are responsible for the bulk of the bits in the GOP. As an illustrative example, in scenarios where video transmission system experiences sudden drop in available bandwidth, or where a consumer of the video is interested in certain region within the video picture, there may be a need to transmit and present given region of interest within the video picture. Existing video coding systems achieve this by discarding already transmitted portion of the video and re-encoding and re-sending new video. For example, as illustrated in FIG. 1, both a first reference picture 104 a second reference picture 108 may be encoded and transmitted 112. This is not only inefficient, but also induces delays on the decoder side which impair user experience.

The current subject matter relates to systems and processes adaptive cropping, which is a technique that enables additional flexibility for the video encoder/decoder allowing bitrate savings in various use cases. In general, adaptive cropping combines cropping as signaled in a bitstream with adaptive scaling as signaled in the bitstream; adaptive cropping may include performing a prediction using a reference region of a reference frame as a reference for a current frame, where the reference region "sub-frame" has an area, defined for instance in pixels, that is smaller than an area of the reference frame. In current coding standards, predicted frames are generated from entire reference frames. In adaptive cropping, a reference region within a reference frame can be used as a reference picture to generate the predicted frame. This approach can be used to downscale video resolution, thus reducing bitrate, to focus on a region of interest to a viewer, and/or to focus on a region identified by automated or user-facilitated detection as containing visual data of greater relevance to some purpose and/or task.

In some embodiments, adaptive cropping may be used for any number of frames, at any position within GOP, thus removing the requirement for I-frame re-coding and/or retransmission.

Referring now to FIG. 2, an exemplary embodiment of a frame 204, which may include a reference frame, with a sub-frame representing a cropped portion of the video view is illustrated. Sub-frame may be identified, for instance by a decoder as described in further detail below, within reference frame. Sub-frame may be used as a reference region in a manner analogous to the use of a cropped reference frame, without requiring a cropped reference frame to be transmitted separately, to generate a decoded frame 208. Alternatively, a reference frame may be used without cropping to generate a current frame, which may be cropped and/or resized as described in further detail below, similarly without retransmission of a cropped reference frame. Advantages accruing to this approach may include saving bandwidth used for video transmission, saving resources used for video encoding, and/or saving time needed to decode and play the video. A result may be a superior user experience as well as a more efficient use of resources in devices and/or networks implementing disclosed embodiments.

As a non-limiting and illustrative example, and referring now to FIG. 3, reference frame may have a first resolution defined by a first width D1 and a first height D2, where D1 and D2 may be, without limitation, numbers of units of measurement such as pixels and/or fractions of pixels; an area of reference frame may be defined as an area of a rectangular array of units of measurement D1 and D2, defined as a resolution D1×D2. Sub-frame 304 may have a width W and a height H, defining an area or resolution of W×H. Sub-frame 304 may define a sub-picture within Reference picture that has same or smaller dimensions, where "smaller dimensions" signify that at least one of W and H is smaller than a corresponding dimension of reference frame; in other words, either W is less than D1 or H is less than D2. As a result, resolution or area W×H may be less than resolution or area D1×D2. Sub-frame 304 may be defined by a quadruple (X,Y,W,H), where X,Y is the coordinate of the top-left corner of the sub-frame 304 relative to the top-left corner of the Reference picture, and W,H are width and height of the sub-frame 304 expressed in the units of measurement. It should be noted that alternative quadruples may be selected to define sub-frame 304, such as without limitation coordinates of an alternative corner of sub-frame 304, a set of two diagonally opposed vertices, and/or vectors to any defined points. Data defining sub-frame 304 may be static over a GOP; for instance, a quadruple (X,Y,W,H) or equivalent may be static over a GOP. Alternatively, or additionally, data defining sub-frame 304 may be dynamic. For example, and without limitation, sub-frame 304 change between subsequent pictures of GOP to follow movement of an object and/or person of interest in a video picture. Data may be provided defining sub-frame 304 for each picture of group of pictures; this may be accomplished, without limitation, by a set of data defining sub-frame 304, for instance as described above, for each picture of a group of pictures, by a set of data defining a sub-frame 304 in one picture and further data describing movement of sub-frame 304 from one picture to previous or subsequent picture, or the like. Data defining sub-frame 304 may be specified and/or signaled in a sequence parameter set (SPS); updated data defining sub-frame 304 may be provided in a picture parameter set (PPS) for one or more selected pictures and/or frames of a GOP.

Still referring to FIG. 3, cropped sub-frame 304 may be signaled using at least a vertical offset and at least a horizontal offset; for instance, and without limitation, quadruple as described above may specify a vertical offset from a top edge of frame, a vertical offset from a bottom edge of frame, a horizontal offset from a left edge of frame, and a horizontal offset from a right edge of frame, where offsets may be measured in pixels of a frame either prior to or after rescaling as described in further detail below. As a non-limiting example, at least a vertical offset may include an sps_conf_win_top_offset and an sps_conf_win_bottom offset, which may be signaled in an SPS and may identify, respectively, a vertical offset from a top edge of frame and a vertical offset from bottom edge of frame. As a further non-limiting example, at least a horizontal offset may include an sps_conf_win_left_offset and an sps_conf_win_right_offset, which may be signaled in an SPS and may identify, respectively, a horizontal offset from a left edge of frame and a horizontal offset from a right edge of frame.

With continued reference to FIG. 3, a sub-frame 304 which may be used as a cropped frame may alternatively or additionally be identified by specification of one or more tiles or slices to be included in and/or excluded from the sub-frame 304. Tile number and position within a frame may be signaled in a picture header. In an embodiment, signaling may be explicit; alternatively or additionally, PPS may signal tile rows, columns, row height, and/or column width, any or all of which may be combined and/or utilized by a decoder to determine tile count and/or number. For instance, and without limitation, a PPS parameter denoted as pps_num_exp_tile_columns_minus1, with 1 added to it, may specific a number of explicitly provided tile column widths. As a further non-limiting example, a parameter pps_tile_column_width_minus1 [i], with 1 added to it, may specify the width of the i-th tile column, for instance in units of coding tree blocks (CTBs) for i in the range of 0 to pps_num_exp_tile_columns_minus1, inclusive. A parameter pps_tile_row_height_minus1[i] plus 1, with 1 added to it, may specify the height of the i-th tile row, for instance in units of CTBs for i. Signaled parameters may alternatively or additionally specify numbers and/or dimensions of slices within one or more tiles. For instance, a parameter denoted pps_num_exp_slices_in_tile[i] may specify a number of explicitly provided slice heights for slices in a tile containing the i-th slice. A parameter denoted pps_slice_width_in_tiles_minus1[i], with 1 added to it, may specify a width of the i-th rectangular slice in units of tile columns. A parameter denoted pps_slice_height_in_tiles_minus1 [i], with 1 added to it, may specify a height of the i-th rectangular slice in units of tile rows, for instance when pps_num_exp_slices_in_tile[i] is equal to 0. Persons skilled in the art, upon reviewing the entirety of this disclosure, will be aware of various alternative or additional ways in which tile and/or slice parameters may be signaled and/or determined in and/or from bitstream and/or header parameters, whether implicitly or explicitly.

Further referring to FIG. 3, a frame may be divided into two or more sub-frames 304. Sub-frames 304 may be identified and/or signaled one or more tiles and/or slices as described above, including, without limitation, by specification of tiles and/or slices included in a given sub-frame 304. One or more such sub-frames 304 may be used as a cropped sub-frame 304 as described in this disclosure or excluded therefrom.

With continued reference to FIG. 3, adaptive cropping may be implemented as a mode. In case of adaptive cropping mode activation at some point during decoding, a decoder may have already received a reference frame at resolution D1×D2 and may select a subregion using a quadruple as described above. In some implementations, encoder may signal to the decoder using extra bits in a bitstream. Signaling bits may a reference frame index and/or an index identifying a GOP, within a buffer identifying picture indices at a decoder, and a sub-frame 304 quadruple. Decoder may then perform cropping operation on reference picture as identified by index, and according to quadruple, and optionally a scaling operation on the cropped sub-frame 304. Subsequent frames may be predicted from the cropped and optionally scaled sub-frame 304, or, where sub-frame 304 is a frame decoded as a function of reference frame, may be predicted from reference frame prior to cropping and optionally scaling. Where data defining sub-frame 304 is dynamic as described above, subsequent frames may further be predicted using such data and a reference frame; advantageously, a single reference frame may be used for a sub-frame 304 that moves relative to the reference frame, without requiring retransmission of the reference frame. Cropping and/or resizing may be performed on a reference frame itself prior to decoding a current frame using sub-frame 304; alternatively or additionally, a current frame may be decoded using reference frame and then cropped according to signaling as described above. Similarly, rescaling may be performed on a reference frame and/or subframe prior to decoding of a current frame, or on a current frame subsequent to decoding.

Figure 4:
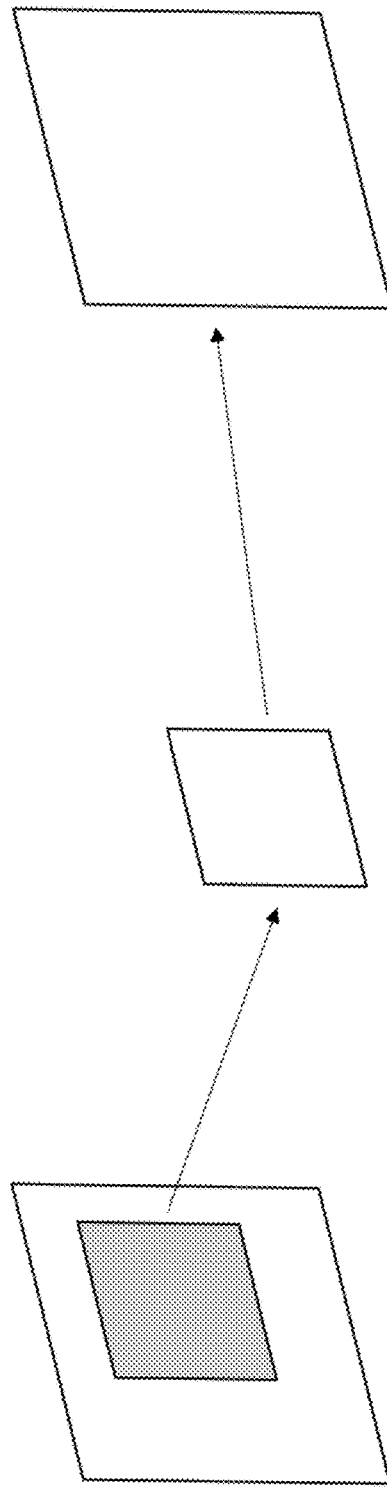
FIG. 4 is an illustration of an example reference frame and example predicted frame.

Referring now to FIG. 4, a decoder may implement adaptive cropping in one of a plurality of modes. In an exemplary embodiment, and as illustrated in FIG. 4, a decoder may implement adaptive cropping using a Reduced Resolution Mode (RRM). An RMM predicted picture may be of the same resolution as sub-frame; for instance, where sub-frame is of a smaller resolution than reference frame, predicted picture may be provided at the same, small resolution. In other words, cropped current frame may retain a resolution of subframe without rescaling. All operations needed to obtain Predicted picture, such as prediction, may be conducted on the region directly, and/or on reference frame prior to cropping. Predicted picture may subsequently be rescaled to a smaller or larger picture.

With further reference to FIG. 4, width and height of smaller and larger frames may be obtained by multiplying reference width and height by an arbitrary rescaling constant (Rc), also referred to as a scaling factor and/or constant, which may alternatively or additionally be referred to with a variable name such as RefPicScale. In case of smaller frames, Rc may have a value between 0 and 1. In case of larger frames, Rc may have a value greater than 1; for instance, Rc may have a value between 1 and 4. Other values are possible. Rescaling constant may be different for one resolution dimension than another; for instance, a rescaling constant Rch may be used to rescale height, while another rescaling constant Rcw may be used to rescale width.

Still referring to FIG. 4, rescaling may be implemented as a mode. In some implementations, an encoder may signal to decoder which rescaling constant to use, for instance as a function of a picture parameter such as pps_pic_width_in_luma_samples parameter, a pps_scaling_win_right_offset parameter, and/or a pps_scaling_win_left_offset parameter. Signaling may be performed in a sequence parameter set (SPS) corresponding to a GOP containing current picture and/or in a picture parameter set (PPS) corresponding to current picture. For instance, and without limitation, encoder may signal rescaled parameters using fields such as a pps_pic_width_in_luma_samples, pps_pic_height_in_luma_samples, pps_scaling_win_left_offset, pps_scaling_win_right_offset, pps_scaling_win_top_offset, pps_scaling_win_bottom_offset, and/or sps_num_subpics_minus1. A parameter such as pps_scaling_window_explicit_signalling_flag equal to 1 may specify that scaling window offset parameters are present in the PPS; pps_scaling_window_explicit_signalling_flag equal to 0 may indicate that the scaling window offset parameters are not present in the PPS. When sps_ref_pic_resampling_enabled_flag is equal to 0, a value of pps_scaling_window_ explicit_signalling_flag may be equal to 0. pps_scaling_win_left_offset, pps_scaling_win_right_offset, pps_scaling_win_top_offset, and pps_scaling_win_bottom_offset may specify offsets that are applied to picture size for scaling ratio calculation. When not present, values of pps_scaling_win_left_offset, pps_scaling_win_right_offset, pps_scaling_win_top_offset, and pps_scaling_win_bottom_offset may be inferred to be equal to pps_conf_win_left_offset, pps_conf_win_right_offset, pps_conf_win_top_offset, and pps_conf_win_bottom_offset, respectively.

Further referring to FIG. 4, W and H parameters as described above may be represented, without limitation, using variables CurrPicScalWinWidthL and CurrPicScalWinHeightL, respectively; these variables may be derived from signaled parameters as described above using one or more mathematical relationships between the signaled parameters and the variables. For instance, and without limitation, CurrPicScalWinWidthL may be derived according to the following equation:

CurrPicScalWinWidthL=pps_pic_width_in_luma_samples−SubWidthC*(pps_scaling_win_right_offset+pps_scaling_win_left_offset)

As a further non-limiting example, CurrPicScalWinHeightL may be derived according to the following equation:

CurrPicScalWinWidthL=pps_pic_width_in_luma_samples−SubWidthC*(pps_scaling_win_right_offset+pps_scaling_win_left_offset)

Persons skilled in the art, upon reviewing the entirety of this disclosure, will be aware of various alternative computations that may be used to derive the above-described variables. Encoder may alternatively or additionally signal one or more such variables, Rc, Rch, and/or Rcw directly for instance and without limitation in a PPS and/or SPS.

Alternatively or additionally, and still referring to FIG. 4, a rescaling constant and/or set of rescaling constants as described above may be signaled in a bitstream using a reference to an index of a stored scaling constant and/or constants, and/or of a frame and/or block that was signaled using a previously signaled and/or utilized scaling constant and/or constants. Reference to index of a stored scaling constant may be signaled explicitly and/or determined from one or more additional parameters signaled in bitstream. For instance, and without limitation, decoder may identify a reference frame and/or group of pictures containing a current frame; where a rescaling constant has previously been signaled and/or used in such a group of pictures, with a reference frame signaled as applicable to current frame and/or current group of pictures, or the like, decoder may identify that rescaling constant for use as a rescaling constant with the current frame.

In some implementations, and with continued reference to FIG. 4, rescaling operation may be executed on a block level of encoded frames and/or sub-frames. For example, a reference frame may first be rescaled and subsequently prediction may be performed. Block prediction process may be performed on a scaled reference frame (having a scaled resolution) rather than the original reference frame. Rescaling reference frame may include rescaling according to any parameter signaled by an encoder as described above; for instance and without limitation, where a reference frame to be used with current picture is signaled, such as via a reference to an index value associated with reference frame or the like, the signaled reference frame may be rescaled, prior to prediction, according to any method of rescaling described above. A rescaled reference frame may be stored in memory and/or in a buffer, which may include without limitation a buffer identifying frames contained therein by indices, according to which frame retrieval may be performed; buffer may include a decoded picture buffer (DCB) and/or one or more additional buffers implemented by decoder. Prediction process may include, for example, inter picture prediction including motion compensation.

Still referring to FIG. 4, some implementations of block-based rescaling may enable flexibility in applying optimal filters for each block, instead of applying same filter for a whole frame. In some implementations, a skip-rescaling mode may be possible such that some blocks (based for example on the uniformity of the pixels and bitrate cost) can be in a skip-rescaling mode (such that rescaling would not change the bitrate). Skip-rescaling mode may be signaled in a bitstream; for instance, and without limitation, skip-rescaling mode may be signaled in a PPS parameter. Alternatively or additionally, decoder may determine that skip-rescaling mode is active based on one or more parameters set by decoder and/or signaled in bitstream.

Still referring to FIG. 4, spatial filters used in rescaling may include, without limitation, bicubic spatial filters that apply bicubic interpolation, bilinear spatial filters that apply bi-linear interpretation, Lanczos filters that use Lanczos filtering and/or Lanczos resampling using combinations of sinc filters, sinc-function interpolation and/or signal reconstruction techniques, or the like; persons skilled in the art, upon reviewing the entirety of this disclosure, will be aware of various filters that may be used for interpolation consistently with this disclosure. Interpolation filters may include, as a non-limiting example, any filters described above, a low-pass filter, which may be used, without limitation, by way of an up-sampling process whereby pixels between pixels of block and/or frame previous to scaling may be initialized to zero, and then populated with an output of the low-pass filter. Alternatively or additionally, any luma sample interpolation filtering process may be used. Luma sample interpretation may include computation of an interpolated value at a half-sample interpolation filter index, falling between two consecutive sample values of a non-scaled sample array. Computation of interpolated value may be performed, without limitation, by retrieval of coefficients and/or weights from lookup tables; selection of lookup tables may be performed as a function of motion models of coding units and/or scaling ratio amounts, for instance as determined using scaling constants as described above. Computation may include, without limitation, performing weighted sums of adjacent pixel values, where weights are retrieved from lookup tables. Computed values may alternatively or additionally be shifted; for instance and without limitation, values may be shifted by Min(4, BitDepth−8), 6, Max(2, 14−BitDepth), or the like. Persons skilled in the art, upon reviewing the entirety of this disclosure, will be aware of various alternative or additional implementations that may be used for interpolation filters.

Figure 5:
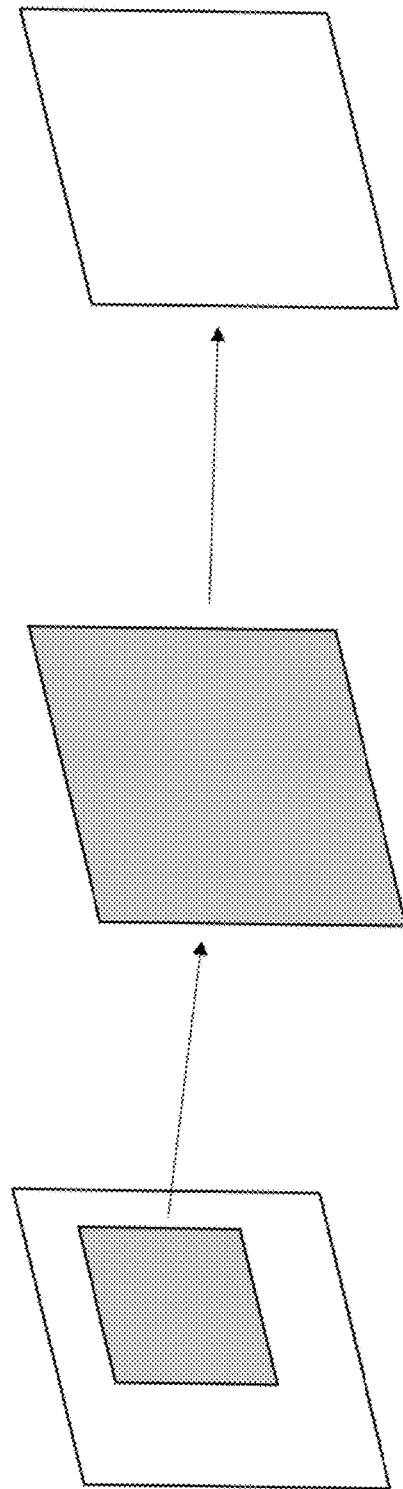
FIG. 5 is an illustration of an example reference frame and example predicted frame.

Referring now to FIG. 5, a decoder may implement adaptive cropping using a Same Resolution Mode (SRM). In SRM a sub-frame may be rescaled, for instance using a rescaling constant as described above, to match the full resolution of the video; for instance, W and H may each be multiplied by an Rc selected to scale W and H to the same size as D1 and D2 as described above, such as without limitation Rc=D1/W. Prediction and other operations may be performed to obtain predicted picture using rescaled sub-frame.

Figure 6:
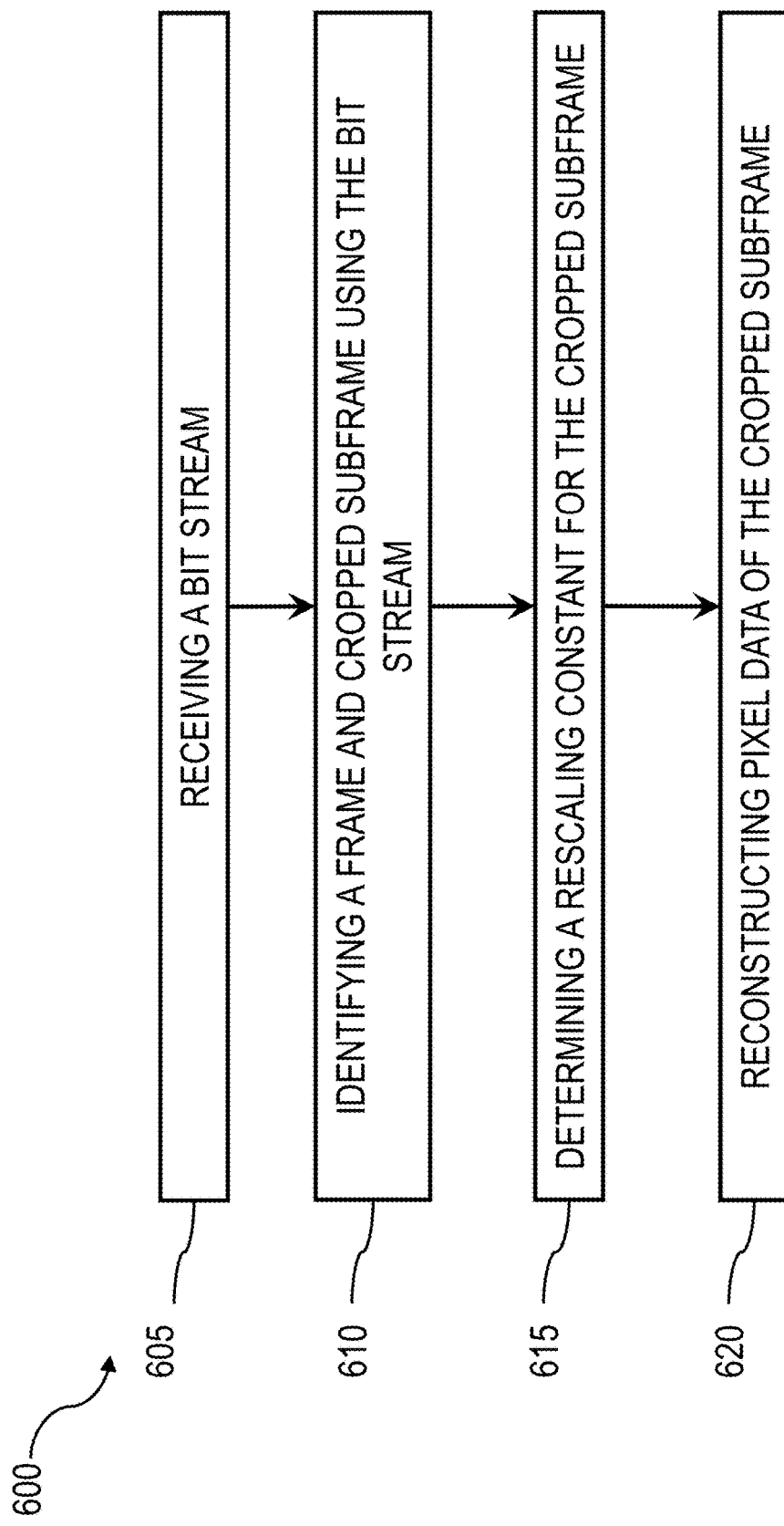
FIG. 6 is a process flow diagram illustrating an example process according to some implementations of the current subject matter.

Referring now to FIG. 6, an exemplary embodiment of a method 600 of adaptive cropping is disclosed. At step 605, a bit stream is received at a decoder. A current frame including a current block can be contained within a bit stream that the decoder receives. The bit stream can include, for example, data found in a stream of bits that is the input to a decoder when using data compression. The bit stream can include information necessary to decode a video. Receiving can include extracting and/or parsing the block and associated signaling information from the bit stream. In some implementations, the current block can include a coding tree unit (CTU), a coding unit (CU), or a prediction unit (PU).

At step 610, and with continued reference to FIG. 6, a first frame is identified using the bit stream. A cropped sub-frame of first frame is identified as a function of the bitstream. Identifying the cropped sub-frame may include receiving, in the bitstream, a geometric characterization of the cropped sub-frame; this may be implemented in any manner described in this disclosure, such as without limitation quadruple such as (X,Y,W,H) as described above. Geometric characterization may include updates to data defining cropped sub-frame where cropped sub-frame location relative reference frame is dynamic as described above.

At step 615, and still referring to FIG. 6, decoder determines a scaling constant associated with the cropped sub-frame as a function of the bitstream. This may be implemented, without limitation, as described above.

At step 620, and still referring to FIG. 6, decoder reconstructs pixel data of the cropped sub-frame using the scaling constant; this may be implemented, without limitation, as described above.

Still referring to FIG. 6, in some implementations, sub-frame may be displayed, for instance as a picture in a GOP.

In some implementations, and with continued reference to FIG. 6, a second frame or a portion thereof in an adaptive cropping mode and using the sub-frame as a reference frame. Decoding may include, without limitation, decoding in RRM as described above, or in other words performing decoding operations without rescaling the sub-frame. Decoding may include, without limitation decoding in SRM as described above. Decoding may include generating a scaled reference frame using the scaled sub-frame and a scaling constant and decoding the second frame or portion thereof using the scaled reference frame.

Figure 7:
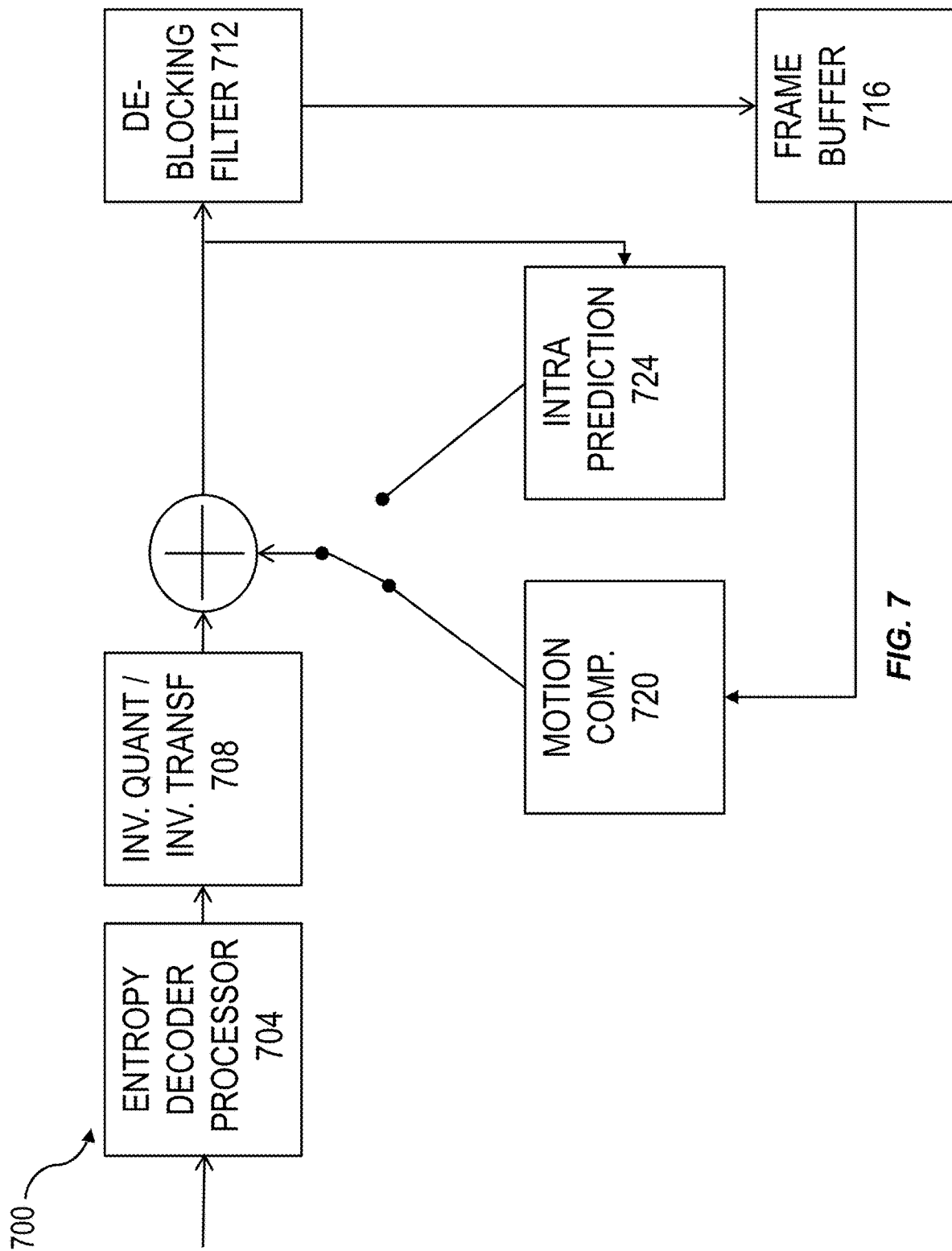
FIG. 7 is a system block diagram illustrating an example decoder capable of decoding a bit stream according to some implementations of the current subject matter.

FIG. 7 is a system block diagram illustrating an example decoder 700 capable of adaptive cropping. Decoder 700 may include an entropy decoder processor 704, an inverse quantization and inverse transformation processor 708, a deblocking filter 712, a frame buffer 716, a motion compensation processor 720 and/or an intra prediction processor 724.

In operation, and still referring to FIG. 7, bit stream 728 may be received by decoder 700 and input to entropy decoder processor 704, which may entropy decode portions of bit stream into quantized coefficients. Quantized coefficients may be provided to inverse quantization and inverse transformation processor 708, which may perform inverse quantization and inverse transformation to create a residual signal, which may be added to an output of motion compensation processor 720 or intra prediction processor 724 according to a processing mode. An output of the motion compensation processor 720 and intra prediction processor 724 may include a block prediction based on a previously decoded block. A sum of prediction and residual may be processed by deblocking filter 712 and stored in a frame buffer 716.

In an embodiment, and still referring to FIG. 7 decoder 700 may include circuitry configured to implement any operations as described above in any embodiment as described above, in any order and with any degree of repetition. For instance, decoder 700 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 8:
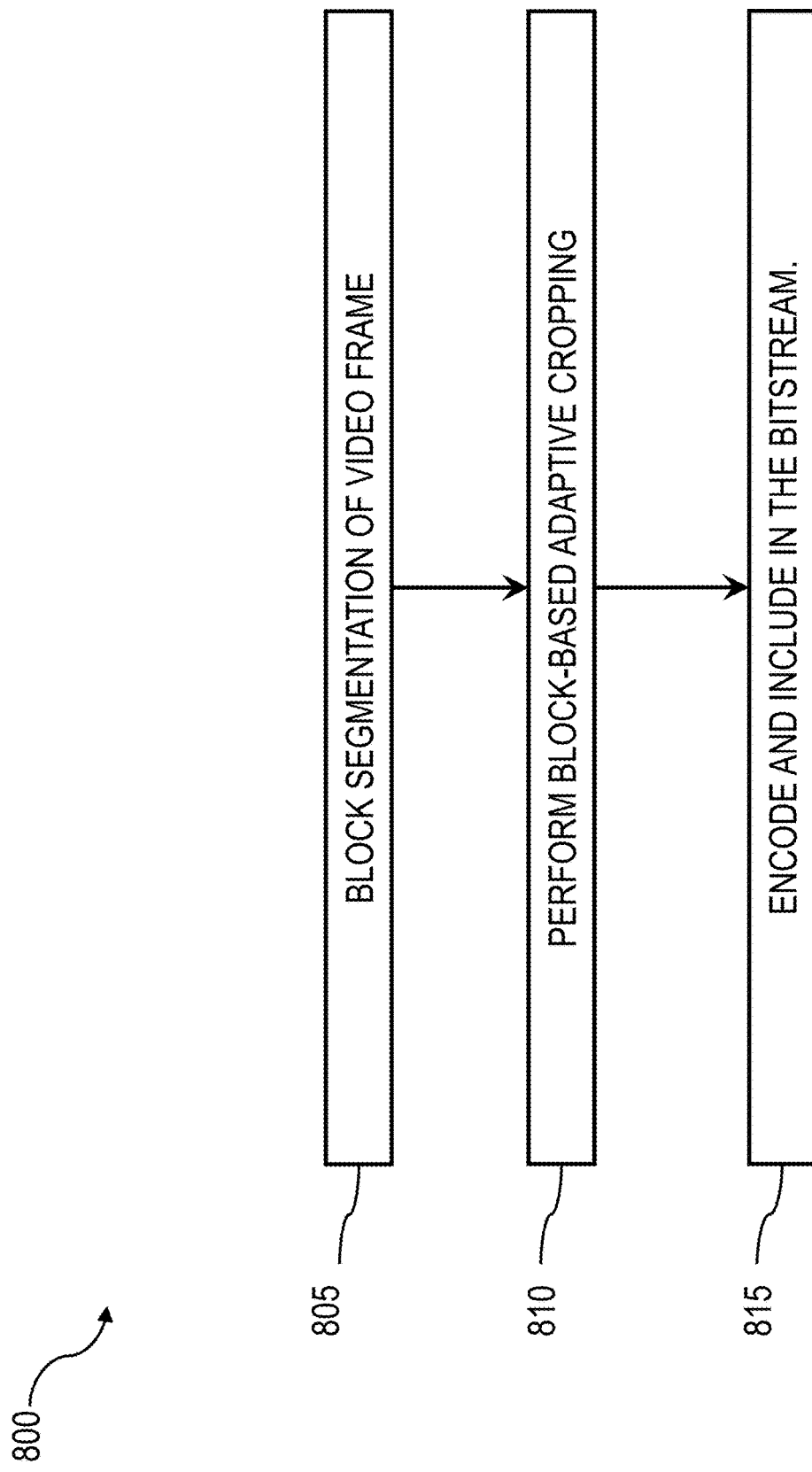
FIG. 8 is a process flow diagram illustrating an example process of encoding a video according to some implementations of the current subject matter.

FIG. 8 is a process flow diagram illustrating an example process 800 of encoding a video with adaptive cropping that can enable additional flexibility for the video encoder/decoder allowing bitrate savings in various use cases. At step 805, a video frame may undergo initial block segmentation, for example, using a tree-structured macro block partitioning scheme that can include partitioning a picture frame into CTUs and CUs.

At step 810, and still referring to FIG. 8, block-based adaptive cropping may be performed, including selection of a sub-frame of a frame or portion thereof. Region may be selected by the means of automatic or expert input. Automatic selection may be achieved, as a non-limiting example, by a computer vision algorithm that detecting certain objects; object detection may include further processing such as object classification or the like. Expert input selection may be achieved, without limitation, using human manual intervention, for example selecting a close-up of a person and/or object of interest in a video, such as a person in a surveillance video. Another possible use case may be to select a maximally salient region that contributes the most to a bit rate reduction. Adaptive cropping may further include selection of a geometric characterization of sub-frame; for instance, and without limitation, selection of geometric characterization of sub-frame may include selection of a quadruple as described above, such as without limitation (X,Y,W,H). Selection of geometric characterization of sub-frame may include updating information and/or information indicating changes to data defining sub-frame from one frame to another as described above with regard to dynamic data defining sub-frame.

Still referring to FIG. 8, at step 815, block may be encoded and included in the bit stream. Encoding can include utilizing inter prediction and intra prediction modes, for example. Encoding may include adding bits to the bitstream characterizing (X,Y,W,H), identifying adaptive cropping mode, or the like, for instance as described above. Encoding may include encoding updating information and/or information indicating changes to data defining sub-frame from one frame to another as described above with regard to dynamic data defining sub-frame. In embodiments, encoder may determine and transmit a rescaling constant as described above.

Figure 9:
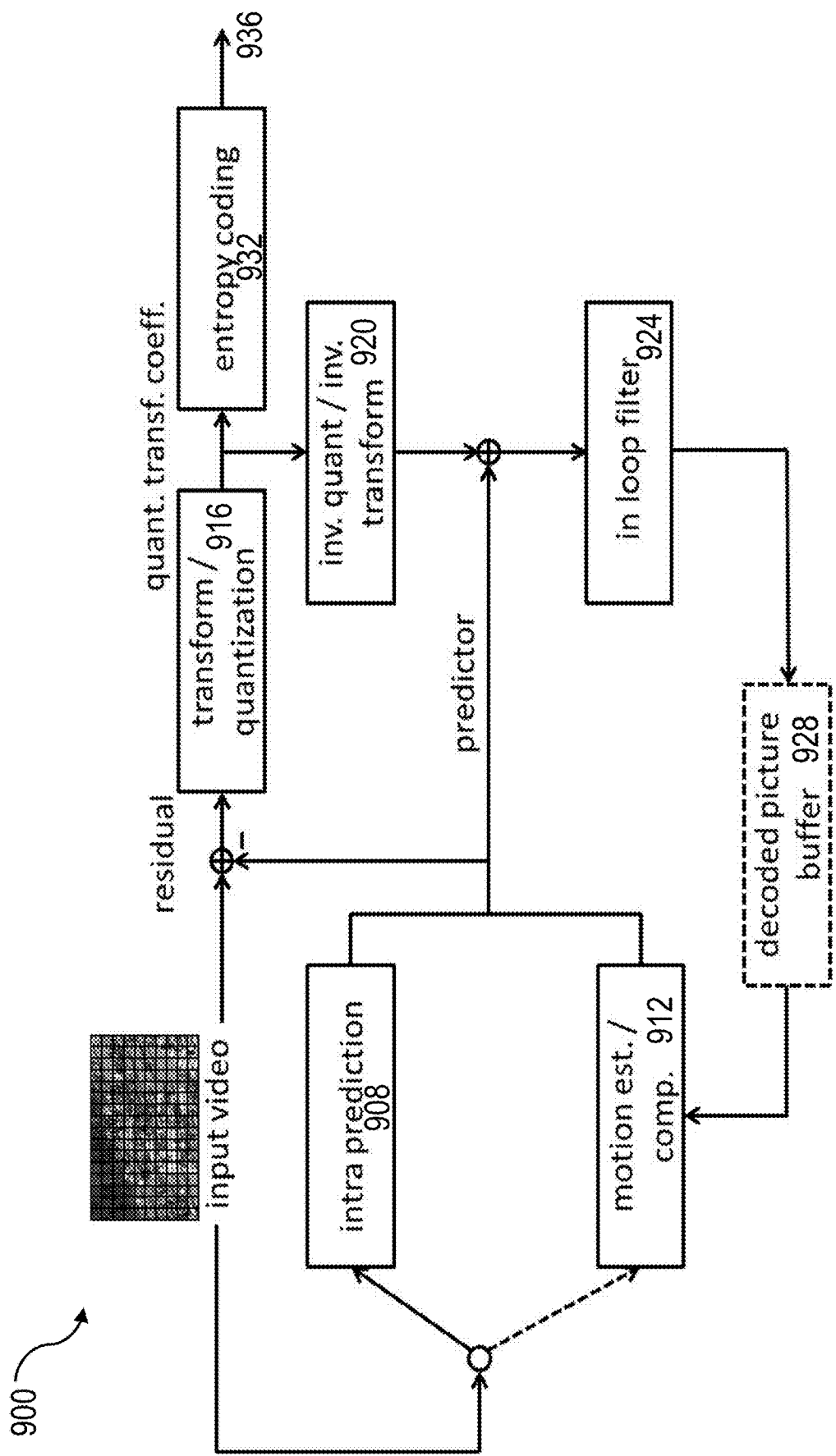
FIG. 9 is a system block diagram illustrating an example video encoder according to some implementations of the current subject matter.
Figure 10:
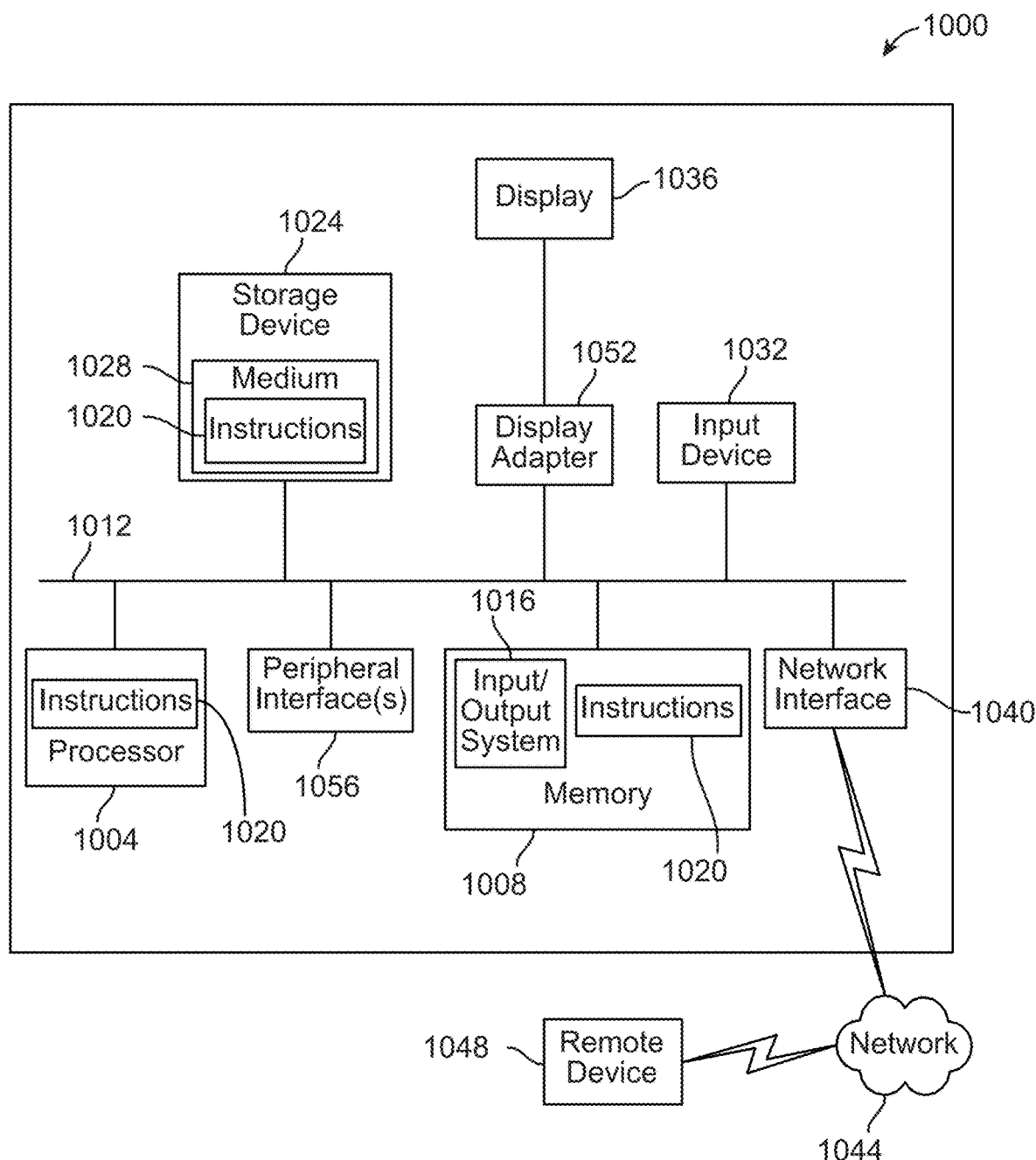
FIG. 10 is a block diagram of a computing system that can be used to implement any one or more of the methodologies disclosed herein and any one or more portions thereof.

FIG. 9 is a system block diagram illustrating an example video encoder 900 capable of adaptive cropping. Example video encoder 900 may receive an input video 904, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 9, example video encoder 900 may include an intra prediction processor 908, a motion estimation/compensation processor 912, which may also be referred to as an inter prediction processor, capable of constructing a motion vector candidate list including adding a global motion vector candidate to the motion vector candidate list, a transform/quantization processor 916, an inverse quantization/inverse transform processor 920, an in-loop filter 924, a decoded picture buffer 928, and/or an entropy coding processor 932. Bit stream parameters may be input to the entropy coding processor 932 for inclusion in the output bit stream 936.

In operation, and with continued reference to FIG. 9, for each block of a frame of input video 904, whether to process block via intra picture prediction or using motion estimation/compensation may be determined. Block may be provided to intra prediction processor 908 or motion estimation/compensation processor 912. If block is to be processed via intra prediction, intra prediction processor 908 may perform processing to output a predictor. If block is to be processed via motion estimation/compensation, motion estimation/compensation processor 912 may perform processing including constructing a motion vector candidate list including adding a global motion vector candidate to the motion vector candidate list, if applicable.

Further referring to FIG. 9, a residual may be formed by subtracting a predictor from input video. Residual may be received by transform/quantization processor 916, which may perform transformation processing (e.g., discrete cosine transform (DCT)) to produce coefficients, which may be quantized. Quantized coefficients and any associated signaling information may be provided to entropy coding processor 932 for entropy encoding and inclusion in output bit stream 936. Entropy encoding processor 932 may support encoding of signaling information related to encoding a current block. In addition, quantized coefficients may be provided to inverse quantization/inverse transformation processor 920, which may reproduce pixels, which may be combined with a predictor and processed by in loop filter 924, an output of which may be stored in decoded picture buffer 928 for use by motion estimation/compensation processor 912 that is capable of constructing a motion vector candidate list including adding a global motion vector candidate to the motion vector candidate list.

With continued reference to FIG. 9, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and still referring to FIG. 9, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 9, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Some embodiments may include non-transitory computer program products (i.e., physically embodied computer program products) that store instructions, which when executed by one or more data processors of one or more computing systems, cause at least one data processor to perform operations herein.

Still referring to FIG. 9, encoder 900 may include circuitry configured to implement any operations as described above in reference to FIG. 8 or 9 in any embodiment, in any order and with any degree of repetition. For instance, encoder 900 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoder 900 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 9, non-transitory computer program products (i.e., physically embodied computer program products) may store instructions, which when executed by one or more data processors of one or more computing systems, causes at least one data processor to perform operations, and/or steps thereof described in this disclosure, including without limitation any operations described above in reference to FIGS. 6 and 8 and/or any operations decoder 700 and/or encoder 900 may be configured to perform. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

Embodiments disclosed herein include a decoder including circuitry configured to receive a bit stream, identify, as a function of the bitstream, a current frame, and a cropped sub-frame of the current frame, determine, as a function of the bitstream, a scaling constant associated with the cropped sub-frame, and reconstruct pixel data of the cropped sub-frame using the scaling constant.

In embodiments, the cropped sub-frame may be signaled in the bitstream. The cropped sub-frame may be signaled in a sequence parameter set (SPS). The cropped sub-frame may be signaled using at least a vertical offset and at least a horizontal offset. The at least a vertical offset may include an sps_conf_win_top_offset and an sps_conf_win_bottom offset and the at least a horizontal offset may include an sps_conf_win_left_offset and an sps_conf_win_right_offset. The scaling constant may include a vertical scaling component and a horizontal scaling component. The scaling constant may be signaled within the bit stream. The scaling constant is signaled in a picture parameter set (PPS). The scaling constant may be signaled as a function of a pps_pic_width_in_luma_samples parameter, a pps_scaling_win_right_offset parameter, and a pps_scaling_win_left_offset parameter. The decoder may be configured to scale the cropped sub-frame by interpolating pixel values.

In an embodiment, a includes receiving, by a decoder, a bit stream, identifying, by the decoder and as a function of the bitstream, a current frame, and a cropped sub-frame of the current frame, determining, by the decoder and as a function of the bitstream, a scaling constant associated with the cropped sub-frame, and reconstructing, by the decoder, pixel data of the cropped sub-frame using the scaling constant.

In embodiments, the cropped sub-frame may be signaled in the bitstream. The cropped sub-frame may be signaled in a sequence parameter set (SPS). The cropped sub-frame may be signaled using at least a vertical offset and at least a horizontal offset. The at least a vertical offset may include an sps_conf_win_top_offset and an sps_conf_win_bottom offset and the at least a horizontal offset may include an sps_conf_win_left_offset and an sps_conf_win_right_offset. The scaling constant may include a vertical scaling component and a horizontal scaling component. The scaling constant may be signaled within the bit stream. The scaling constant is signaled in a picture parameter set (PPS). The scaling constant may be signaled as a function of a pps_pic_width_in_luma_samples parameter, a pps_scaling_win_right_offset parameter, and a pps_scaling_win_left_offset parameter. The decoder may be configured to scale the cropped sub-frame by interpolating pixel values.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A decoder, the decoder comprising circuitry configured to:
receive a bitstream, the bitstream including a first coded picture having a first resolution and a second coded picture having a second resolution, a sequence parameter set associated with both the first and second coded pictures, a first picture parameter set associated with the first picture, and a second picture parameter set associated with the second picture, the sequence parameter set including a first set of parameters defining a first cropping window, the first set of parameters including, a top offset, a bottom offset, a left offset and a right offset;
decode the first coded picture and store the first picture as a reference picture;
determine a vertical scaling factor as a function of the top offset and bottom offset parameters in the sequence parameter set
determine a horizontal scaling factor as a function of the left offset and right offset parameters in the sequence parameter set;
determine a predictor for the second picture from the reference picture and the vertical scaling factor and horizontal scaling factor;
decode the second coded picture using the predictor, and output for display the first picture as cropped in accordance with the first set of parameters defining the first cropping window in the sequence parameter set.

2. The decoder of claim 1 wherein:
the second picture parameter set includes a second set of parameters different from the first set of parameters and defining a second cropping window, the second set of parameters including a second top offset, a second bottom offset, a second left offset and a second right offset,
the second picture is decoded and stored as a second reference picture,
a second vertical scaling factor is determined as a function of the second top offset and second bottom offset,
a second horizontal scaling factor is determined as a function of the second left offset and second right offset, and
a second predictor is determined from the second reference picture, the second horizontal scaling factor and the second vertical scaling factor.

3. The decoder of claim 1, wherein
the first resolution is smaller than the second resolution.

4. The decoder of claim 1, wherein the second resolution is smaller that the first resolution.

5. The decoder of claim 1, further comprising:
an entropy decoder processor configured to receive the bit stream and decode the bitstream into quantized coefficients;
an inverse quantization and inverse transformation processor configured to process the quantized coefficients including performing an inverse discrete cosine;
a deblocking filter;
a frame buffer; and
an intra prediction processor.

6. A decoder configured to:
receive a bitstream, the bitstream including:
a first coded picture having a first resolution and a second coded picture having a second resolution,
a sequence parameter set associated with both the first and second coded pictures, the sequence parameter set including a first set of parameters defining a first cropping window,
a first picture parameter set associated with the first picture, and
a second picture parameter set associated with the second picture;
decode the first coded picture and store the first picture as a reference picture;
determine a scaling factor from at least one parameter in the sequence parameter set defining the first cropping window;
determine a predictor for the second picture from the reference picture and the scaling factor;
decode the second coded picture using the predictor; and
output for display the first picture as cropped in accordance with the first set of parameters defining the first cropping window in the sequence parameter set.

7. The decoder of claim 6 wherein:
the second picture parameter set includes a second set of parameters different from the first set of parameters and defining a second cropping window;
the second picture is decoded and stored as a second reference picture;
a second scaling factor is determined from at least one parameter in the second set of parameters; and
a second predictor is determined from the second reference picture and the second scaling factor.

8. The decoder of claim 7, wherein the first set of parameters comprise a plurality of values from which four corners of a rectangular cropping window can be determined.

9. The decoder of claim 7, wherein the first set of parameters defining a first cropping window comprise a top offset, a bottom offset, a left offset and a right offset.

10. The decoder of claim 6 wherein the first resolution is smaller than the second resolution.

11. The decoder of claim 6 wherein the second resolution is smaller than the first resolution.

* * * * *